(12) United States Patent
Bruno et al.

(10) Patent No.: US 6,604,123 B1
(45) Date of Patent: Aug. 5, 2003

(54) OPERATING SYSTEM TRANSFER OF CONTROL AND PARAMETER MANIPULATION USING PORTALS

(75) Inventors: John Louis Bruno, Santa Barbara, CA (US); Jose' Carlos Brustoloni, Chatham, NJ (US); Eran Gabber, Summit, NJ (US); Abraham Silberschatz, Warren, NJ (US); Christopher Allen Small, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/311,229

(22) Filed: May 13, 1999

Related U.S. Application Data

(60) Provisional application No. 60/121,260, filed on Feb. 23, 1999.

(51) Int. Cl.[7] .................................................. G06F 9/00
(52) U.S. Cl. ........................ 709/100; 709/203; 709/228; 709/229
(58) Field of Search ................................. 709/100, 101, 709/102, 103, 104, 105, 106, 107, 108, 203, 223, 224, 328, 329, 332

(56) References Cited

PUBLICATIONS

"Beyond Micro_Kernel Design: Decoupling Modularity and Protection in Lipto", Peter Druschel and Larry L. Peterson, 1992 IEEE.*
"Kea–A Dynamically Extensible and Configurable Operating System Kernel", Alistair C. Veitch et al., 1996 IEEE.*
"Modularity and Proection Should be Decoupled", Peter Druschel and Larry L. Peterson, 1992 IEEE.*

D. Probert and J. Bruno, "Building Fundamentally Extensible Application–Specific Operating Systems in SPACE", Computer Science Department, U. of California, Santa Barbara, CA,–TRCS95–06–Mar. 1995.

D. Probert and J. Bruno, Computer Science Department, U. of California, Santa Barbara, CA, "Efficient Cross–domain Mechanisms for Building Kernel–less Operating Systems", Technical Report TRCS96–06, University of California, Santa Barbara, May 1996.

(List continued on next page.)

*Primary Examiner*—Majid Banankhah
(74) *Attorney, Agent, or Firm*—Jeffrey M. Weinick

(57) ABSTRACT

A computer operating system in which transfer of control of executing threads between protection domains is implemented using specific portals dedicated to the particular transfer of control between two protection domains. The transfer of control may also include parameter manipulation. A server registers a portal specification with a portal manager, the portal specification defining the behavior of portals which transfer control to the server. Thereafter, when a client application desires service from the server, the client application requests instantiation of a portal which will transfer control of an execution thread from the client application protection domain to the server protection domain. Upon receipt of the request, the portal manager dynamically generates portal code and updates a portal table associated with the client application, thus instantiating the portal. When the client application desires to invoke the server, the client application issues a system call instruction which results in switching the processor to privileged mode, followed by a lookup to the portal table and a transfer of control to the portal code identified in the portal table. The execution of the portal code results in transfer of control of the execution thread to the protection domain of the server. Various parameter manipulation techniques are disclosed for improving the efficiency of the transfer of control.

29 Claims, 5 Drawing Sheets

OTHER PUBLICATIONS

J.G. Mitchell, J.J. Gibbons, G. Hamilton, P. B. Kessler, Y.A. Khalidi, P. Kougiouris, P. W. Madany, M.N. Nelson, M.L. Powell, and S. R. Radia, "An Overview of the Spring System", *Proceedings of Compcon Spring 1994*, Feb. 1994, pp. 122–131.

A.C. Veitch and N.C. Hutchinson, "Kea–A Dynamically Extensible and Configurable Operating System Kernel", published in the *Proceedings of the Third Conference on Distributed Systems (ICCDS '96)*, 1996.

Massalin, H. and Pu, C., "Threads and Input/Output in the Synthesis Kernel," *Proceedings of the $12^{th}$ ACM Symposium on Operating Systems Principles (SOSP)*, 1989, pp. 191–201.

Bershad, B.N., et al., "Lightweight Remote Procedure Call," *ACM Transactions on Computer Systems*, vol. 8, No. 1, Feb. 1990, pp. 37–55.

* cited by examiner

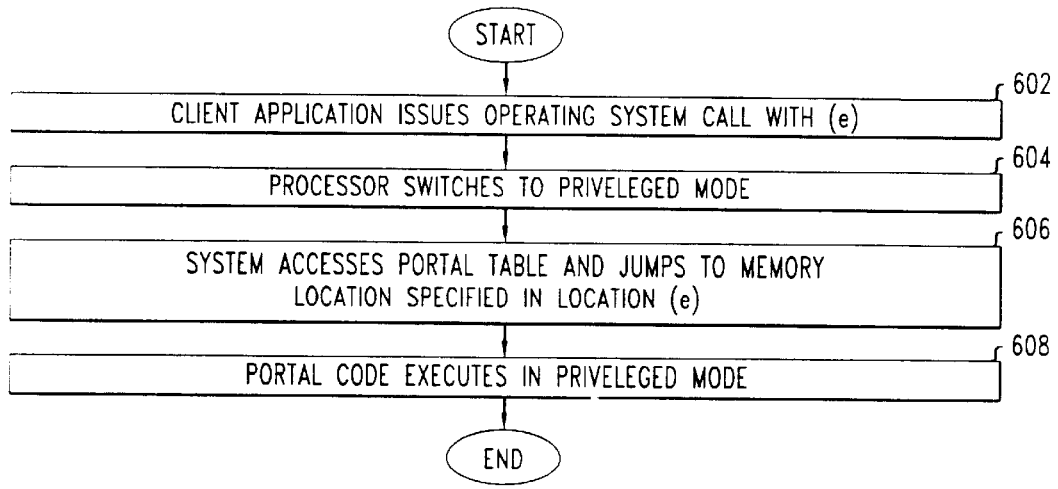
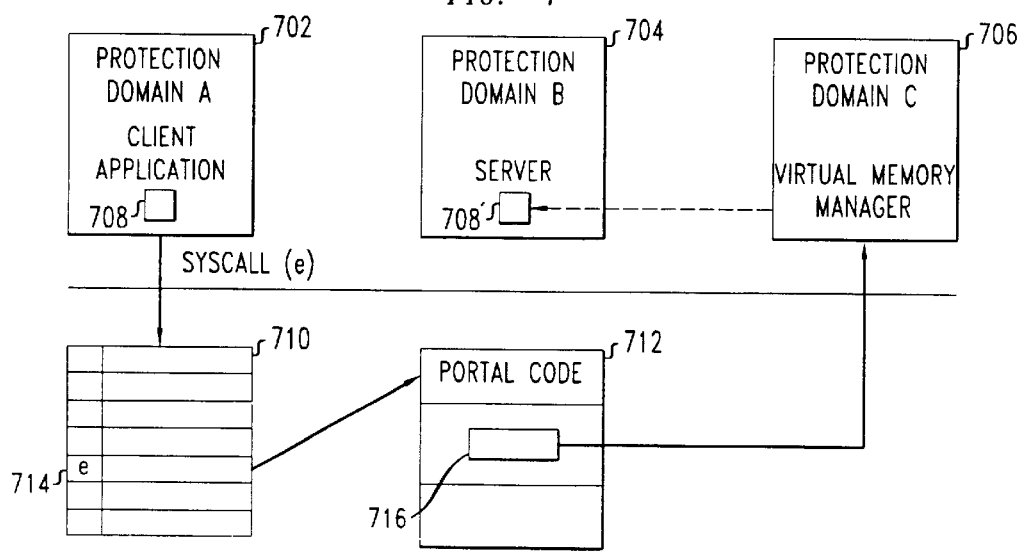
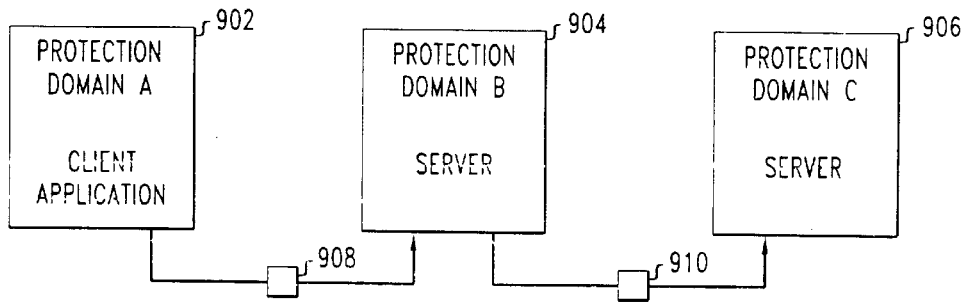

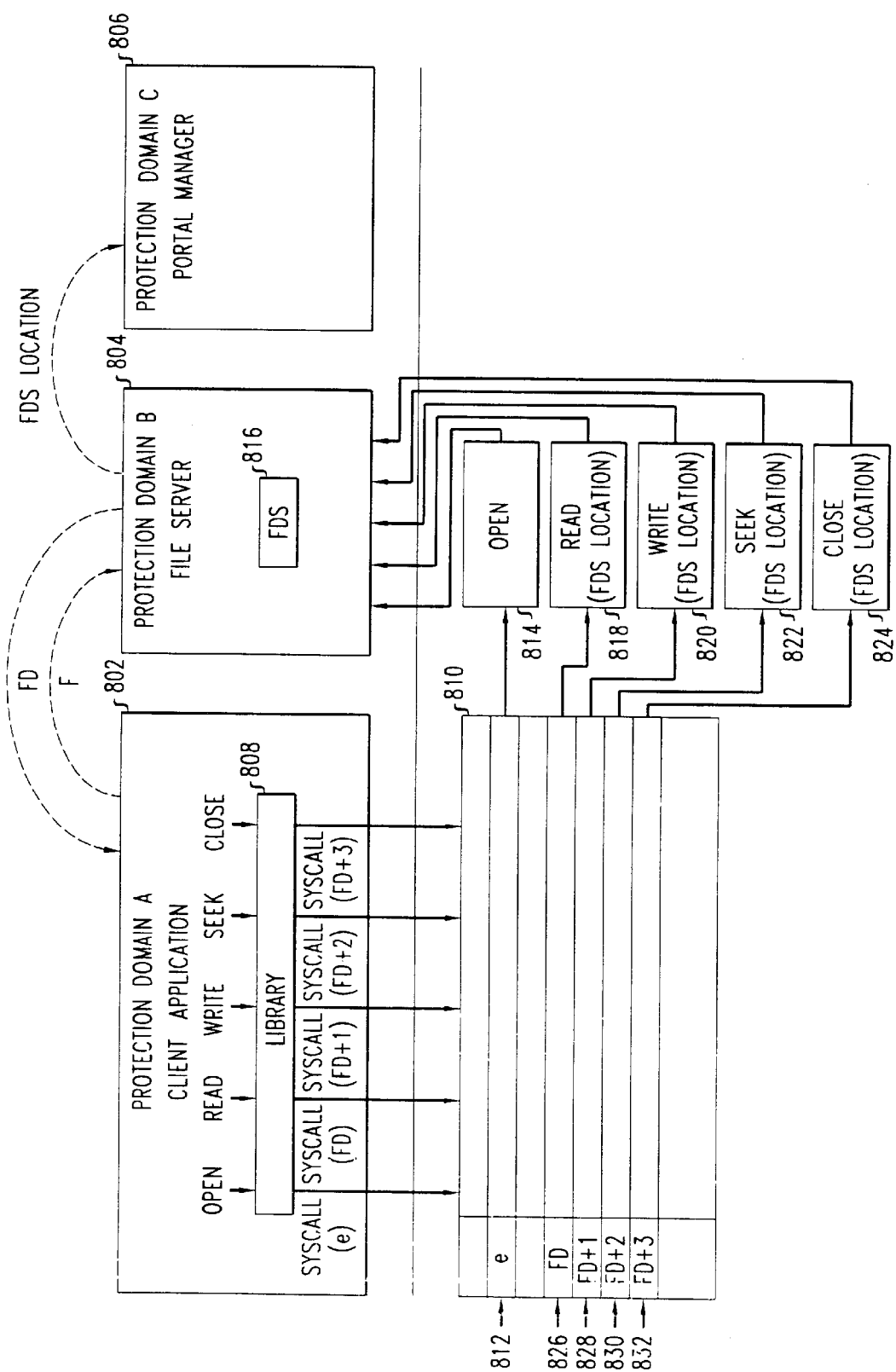

OPERATING SYSTEM TRANSFER OF CONTROL AND PARAMETER MANIPULATION USING PORTALS

This application claims the benefit of U.S. Provisional Application Ser. No. 60/121,260, filed Feb. 23, 1999.

FIELD OF THE INVENTION

The present invention relates generally to computer operating systems. More particularly, the present invention relates to a technique for transfer of control and parameter manipulation between computer system protection domains.

BACKGROUND OF THE INVENTION

A computer operating system is the software in a computer system that performs three basic functions. First, it manages the resources of the computer system and allows such resources to be shared among multiple users. For example, several applications may reside in memory, but only one application may be executing on the CPU at any given time. Another example is a single printer that is shared among multiple applications. Second, the operating system protects the applications executing on the system from corruption, for example from other concurrently executing applications. As an illustration, the operating system protects the memory space of an application and will not allow another errant application to corrupt the memory space. Third, the operating system provides an abstraction layer on top of the hardware of the computer system thus allowing access to the lower level hardware resources using higher level abstractions. For example, a physical disk drive allows data to be stored on the drive, but there is no intrinsic organization to that data. An operating system file system provides an abstraction layer between the physical disk drive and applications thus providing an organized file system.

Computer processors generally have two modes of operation, a privileged mode and a user mode. These modes are implemented at the hardware level of the processor. The privileged mode allows execution of all processor instructions, giving complete access to the hardware. Operating system software generally executes in privileged mode. The user mode is the mode in which most user applications execute. The instructions that can be performed while in user mode are restricted by the hardware of the system. Executing in user mode ensures that user applications cannot execute instructions that will interfere with the operating system or other user applications.

In the following description, user application programs that request services from the operating system are referred to as "client applications".

Most operating systems are structured as either monolithic or micro-kernel. A monolithic operating system is an operating system in which most of the operating system functions and services are resident in the operating system kernel. The kernel is the portion of the operating system which provides the basic operating system functionality. The software in the kernel is loaded into memory during initialization of the system. Kernel software typically executes in privileged mode. In a monolithic operating system a client application invokes an operating system function by executing a processor instruction which switches to privileged mode and then jumps to the particular location within the operating system kernel at which the code for the function resides. The client application may pass parameters to the operating system through the system stack.

A micro-kernel operating system, as its name implies, contains less operating system functionality in the operating system kernel. Many of the operating system functions are implemented through user mode applications, called servers. A client application invokes an operating system function by loading the stack with the desired server identification and any parameters to be passed to the server, and then calling a library routine which places the stack information into a generalized message format. The function of taking information from the stack and formatting it into a generalized message format is called message marshaling. The client application then calls a function in the operating system kernel which determines the correct server based on the server identification, passes the marshaled message to the server, and transfers control to the server. The server un-marshals the message to retrieve the parameters and performs some function. The message format is highly generalized, and the same format is used for invoking various operating system functions.

One benefit of a micro-kernel operating system is its flexibility. Servers may be changed and modified without changing the operating system kernel, and client applications can choose between multiple servers providing the same or similar services. In some implementations, the servers may be located on a different physical machine than the client application, and the communication between client applications and servers is achieved via messages sent on a network.

One problem with micro-kernel operating systems is that the context switch which results when a client application invokes an operating system function is often slow. As described above, parameter passing from the client application to the server requires message marshaling and un-marshaling. In addition, the server must check the parameters prior to performing the service in order to confirm that the parameters are in the correct format and that they are within allowed boundaries. Both of these parameter related functions take time and slow down the context switch. In addition, there is demultiplexing overhead. Since client applications invoke servers using a generalized request format which includes an identification of the server requested, the operating system must demultiplex the request to determine what server the client application is requesting. It is noted that these message marshaling, parameter checking, and demultiplexing functions must be performed each time a client application requests an operating system service by invoking a server.

Some of these performance problems have been solved through the use of portals, which provide for the transfer of control between computer system domains. The use of portals is described in D. Probert and J. Bruno, Building Fundamentally Extensible Application-Specific Operating Systems in SPACE, UCSB Computer Science—TRCS95-06, Mar., 1995; D. Probert and J. Bruno, Efficient Cross-domain Mechanisms for Building Kernel-less Operating Systems, Technical Report TRCS96-06, University of California, Santa Barbara, May 1996; and A. Beitch and N. Hutchinson, Kea—A Dynamically Extensible and Configurable Operating System Kernel, Proceedings of the Third Conference on Configurable Distributed Systems (ICCDS) 1996. A similar construct, called a door, for providing transfer of control between computer system domains is described in J. Mitchell, J. Gibbons, G. Hamilton, P. Kessler, Y. Khalidi, P. Kougiouris, P. Madany, M. Nelson, M. Powell, and S. Radia, An Overview of the Spring System, Proceedings of Compcon Spring 1994, February 1994, pp. 122—131.

Generally, as described in the above cited references, portals and doors are software mechanisms which, when executed, manage the transfer of control of program execution between two computer system domains. Portals will be described in further detail in the detailed description.

SUMMARY OF THE INVENTION

The present invention provides novel parameter manipulation and portal management techniques for use in conjunction with the transfer of control between computer system protection domains using portals. A protection domain, as will be described in further detail below, defines an execution environment within the computer system.

In accordance with one embodiment of the invention, portal invocation results in the insertion of a value, which is a function of the state of the computer system, in a parameter list which is passed between protection domains. Thus, when parameters are passed during the transfer of control between computer system protection domains, a portal in accordance with the invention will insert an additional value which is computed as a function of the state of the computer system into the parameter list. While the above referenced prior art portal techniques include the insertion of constants into parameter lists, such prior art techniques do not include the insertion of a value which is computed as a function of the state of the computer system. For example, an identification of the invoking protection domain, or the current date/time, may be inserted into the parameter list.

In accordance with another embodiment of the invention, portal invocation results in the execution of a segment of portal code which was supplied by an operating system server. Thus, a first server may supply code to a portal, where the supplied code defines the parameter manipulation to be performed when a second server is invoked through use of the portal. This technique may be used, for example, to establish a shared memory window between two protection domains. The first and second servers may be the same or different servers.

In accordance with particular embodiments of the invention, system portals are managed by a portal manager. The portal manager handles the registration and instantiation of portals for use by client applications. The portal manager instantiates a portal by dynamically generating portal code at the request of a client application.

In accordance with yet other embodiments of the invention, portals are used to improve the performance of file processing and to provide for compatible parameter manipulation during a sequence of portal invocations.

These and other advantages of the invention will be apparent to those of ordinary skill in the art by reference to the following detailed description and the accompanying drawings.

BRIEF DESCRIPTION OF THE DRAWINGS

FIG. 6 is a flowchart showing the steps performed during invocation of a portal;

FIG. 7 shows the logical elements of a computer system and their relationship and illustrates a parameter manipulation technique for sharing a memory window;

FIG. 8 shows the logical elements of a computer system and their relationship and illustrates a parameter manipulation technique for use in conjunction with file access; and FIG. 9 shows the logical elements of a computer system and their relationship and illustrates compatible parameter passing during a sequence of portal invocations.

DETAILED DESCRIPTION

Figure 1:
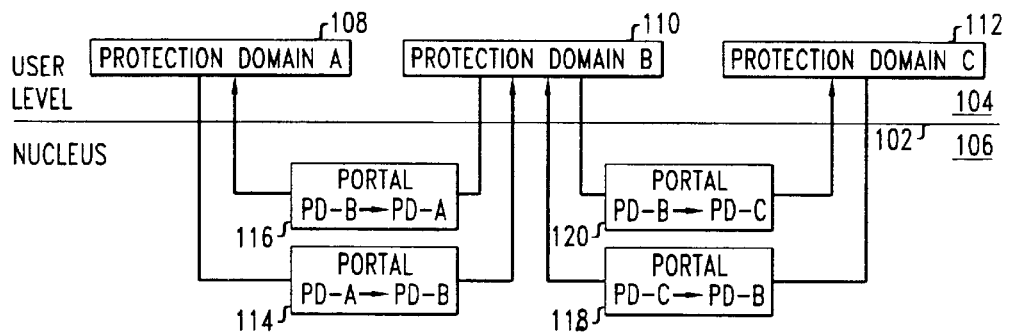
FIG. 1 shows the logical elements of a computer system.

FIG. 1 shows the logical elements of a computer system. The architecture is related to the micro-kernel operating system architecture described above, in which servers are implemented in user mode with the privileged mode handling context switches between client applications and servers.

In FIG. 1, dividing line 102 represents the division between the user level 104 and the operating system nucleus 106. Elements shown residing in the user level 104 are executed in the processor user mode and elements shown in the nucleus 106 are executed in the processor privileged mode. We use the term nucleus to identify the software that resides in the operating system kernel and which executes in processor privileged mode. It is noted that FIG. 1 is a logical representation of functional software modules in a computer system, and does not show the actual hardware which would implement the modules. Such hardware is well known and a detailed description of such hardware is not required for one of ordinary skill in the art to understand and implement the present invention.

FIG. 1 shows three protection domains (PD), protection domain A 108, protection domain B 110, and protection domain C 112, shown residing in the user level 104. A protection domain is a collection of resources which are available to threads executing within that protection domain. A thread is an executable entity defined by a particular machine state. The resources available within a protection domain may be, for example, memory pages, stored computer program code, and stored data. Thus, a protection domain could represent a client application or a server.

The transfer of control of an execution thread between two protection domains is handled via a specific portal which is dedicated to the specific transfer of control between the two protection domains. As used herein, and as will become clear from the following description, a portal is a logical module which defines the specific transfer of control between two protection domains. Referring to FIG. 1, suppose protection domain A 108 is a client application which desires to access a server represented by protection domain B 110. A thread executing in protection domain A 108 traverses to protection domain B through portal 114. Portal 114 defines the transfer of control, as well as any required parameter manipulations. As shown in FIG. 1, the portal 114 resides in the nucleus 106 and controls the context switch between the protection domains A 118 and B 110. Further, the portal 114 performs specific parameter manipulations which are required for the specific transfer of control between protection domain A 108 and protection domain B 110. Such context switch and parameter manipulations will be described in further detail below. When the thread has completed executing in protection domain B 110 (i.e., the server has performed its function), the execution of the thread is transferred back to protection domain A 108 via a return portal 116. In general, return portal 116 will define a traversal which is symmetric to forward portal 114.

Similarly, suppose now that protection domain C 112 is a client application which also desires to access the server represented by protection domain B 110. The thread executing in protection domain C 112 traverses to protection domain B through portal 118 which defines the transfer of control, as well as any required parameter manipulations, for the particular traversal from protection domain C 112 to protection domain B 110. When the thread has completed executing in protection domain B 110, the execution of the thread is transferred back to protection domain C 112 via return portal 120.

As illustrated by FIG. 1, each portal defines a specific transfer of control between two protection domains. Thus, although the server defined by protection domain B 110 is available to both of the client applications defined by protection domains A 108 and B 112, there are two distinct portals. Portal 114 defines the specific traversal from protection domain A 108 to protection domain B 110, and portal 118 defines the specific traversal from protection domain C 112 to protection domain B 110. Since portals are dedicated to a specific transfer of control between two protection domains, performance of the system may be improved because the specific portals can be optimized for the transfer of control between specific protection domains.

Figure 2:
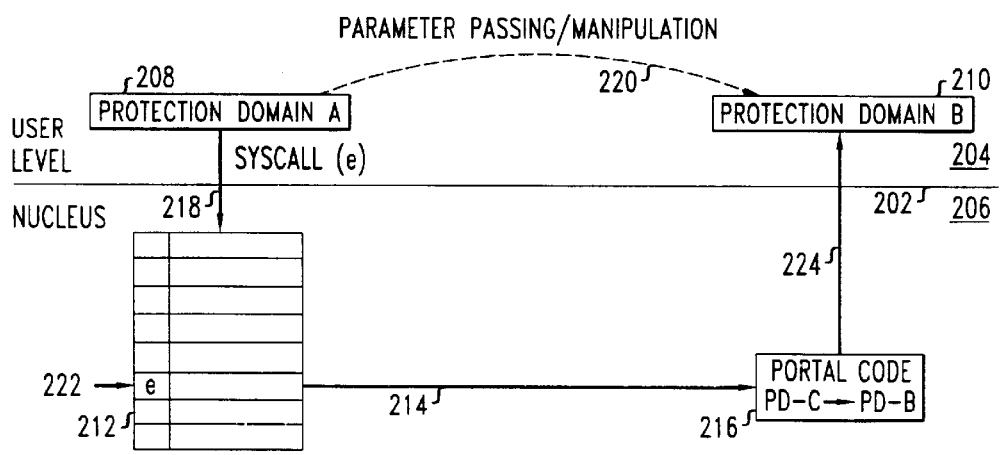
FIG. 2 shows the logical elements of a computer system configured in accordance with one embodiment of the invention.

One embodiment of portals is illustrated in FIG. 2. In a manner similar to that described above in connection with FIG. 1, dividing line 202 represents the division between the user level 204 and the nucleus 206. FIG. 2 shows protection domain A 208 and protection domain B 210 residing in user level 204. Protection domain A 208 has an associated portal table 212 residing in nucleus 206. Portal table 212 contains an entry for each portal defining a traversal from protection domain A 208 to another protection domain. As represented in FIG. 2, the portal from protection domain A 208 to protection domain B 210 has an entry 222 in the portal table 212. Associated with that entry is an index (e) and a pointer 214 to portal code 216 stored in the nucleus 206. Portal code 216 contains binary code executable in privileged mode which will implement the specific portal and manage the transfer of control from protection domain A 208 to protection domain B 210. Thus, suppose that a thread executing in protection domain A 208 wants to traverse to protection domain B 210 and pass certain parameters to protection domain B 210. Also assume that the parameters require manipulation prior to being used in protection domain B 210. The thread executing in protection domain A 208 will issue a system call instruction 218 (e.g. syscall (e)) which indicates a request for a traversal from protection domain A 208 to protection domain B 210. As a result of the system call 218, the operating system will switch to privileged mode, and start executing an exception handling code, which will perform a lookup in the portal table 212 for entry 222 which corresponds to the requested traversal. Upon finding the entry 222, control is transferred to the portal code 216 by following the pointer 214. The portal code 216 defines three basic functions: 1) save state; 2) manipulate parameters; and 3) transfer control. The save state function saves the appropriate machine state of the thread executing in protection domain A 208 so that the thread may return to protection domain A 208 in the same state. The manipulate parameter function will perform the specific parameter manipulation required for this particular traversal, as represented by broken line 220. Finally, the transfer control function will change the identity of the current protection domain to the target domain B 210, manipulate the processor stack as necessary, map the stack into the memory of the target domain B 210 as necessary, and transfer control to a specified point in the destination protection domain B 210. These three functions will be described in further detail below. Upon execution of the portal code 216, the execution of the thread will continue in protection domain B at the specified entry point, as represented by arrow 224.

Although not shown in FIG. 2, in practice, protection domain B 210 would also have a portal table with an entry pointing to return portal code, thus implementing a symmetric return portal so that the executing thread can return to protection domain A. Thus, in the embodiment shown in FIG. 2, portals are implemented using an entry in a portal table with a pointer to particular portal code which, when executed, manages the transfer of control and any required parameter manipulation.

Portal tables have default entries pointing to portal code that is associated with an error condition. Thus, if a protection domain attempts to access a portal which has not been defined, the default portal table entry will result in a jump to the portal code implementing error handling. Further, in accordance with one embodiment, portal tables may be segregated into two parts. A first part contains entries for internal events (i.e., explicit requests by threads to invoke portal traversal to another protection domain). A second part contains entries for external events, for example an interrupt for handling the arrival of a data packet from a local area network or faults associated with the memory management unit. When an external event occurs, the operating system nucleus switches to privileged mode and performs a lookup in the portal table of the domain that was executing at the time that the external event was received. The nucleus then executes the appropriate portal code corresponding to the external event.

Figure 3:
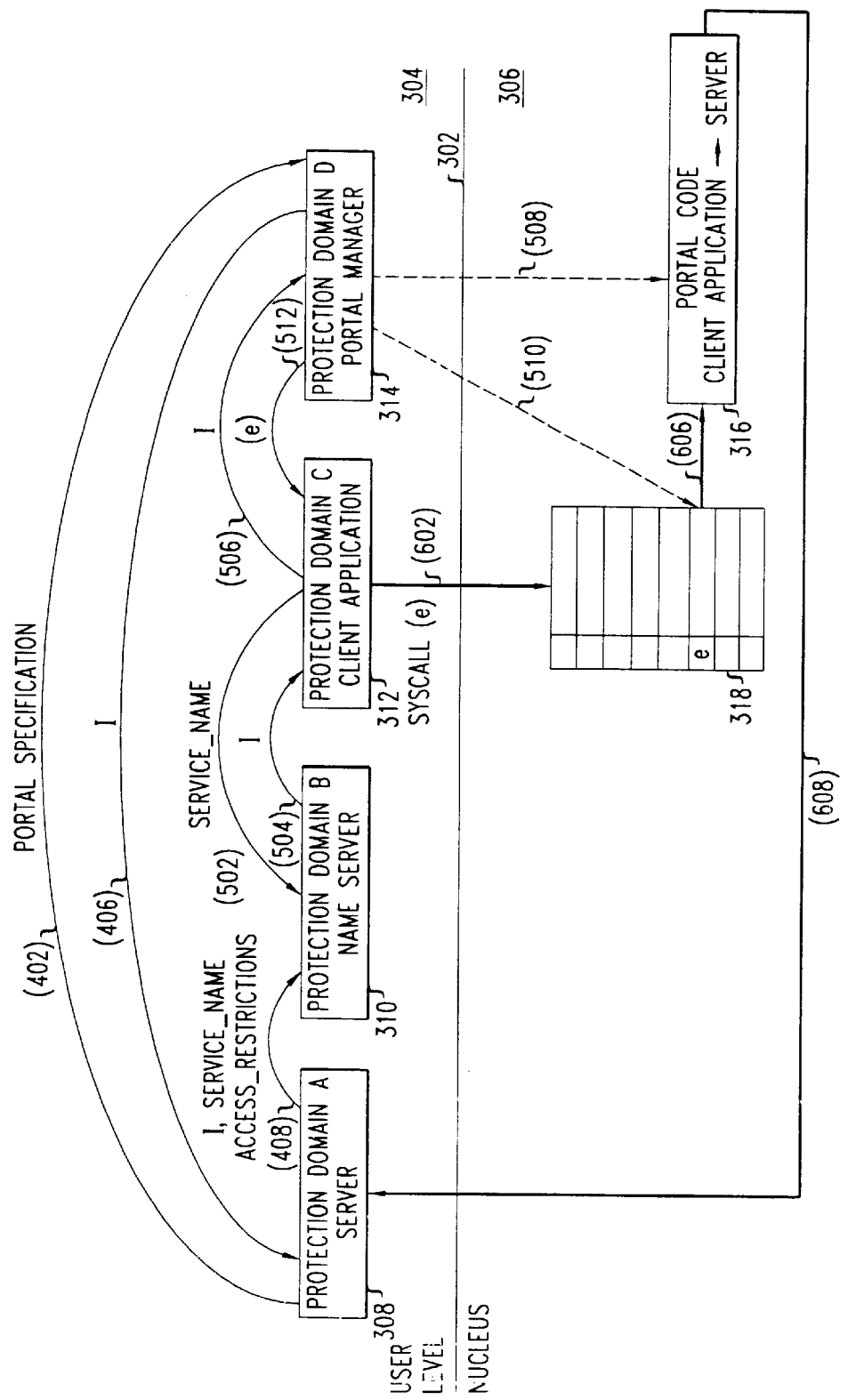
FIG. 3 shows the logical elements of a computer system and their relationship during registration of a server, instantiation of a portal, and invocation of the server using the instantiated portal.

Further details of an embodiment of the invention will be described in conjunction with FIG. 3 and the flowcharts of FIGS. 4–6. With respect to these figures, it is noted that the steps in FIGS. 4–6 which are represented in FIG. 3, are shown in FIG. 3 in parentheses. In a manner similar to that described above in connection with FIGS. 1 and 2, dividing line 302 represents the division between the user level 304 and the nucleus 306. Thus, elements shown in the user level 304 are executed in the processor user mode and elements shown in the nucleus 306 are executed in the processor privileged mode. FIG. 3 shows four protection domains. Protection domain A 308 implements a server that is available to client applications, such as client application implemented by protection domain C 312. Protection domain B 310 implements a name server and protection domain D 314 implements a portal manager, the functions of which will be described in further detail below. In the description that follows, the name of an application implemented by a protection domain will be used as an abbreviation for the identification of the protection domain that implements that application. Thus, for example, "name server 310" is used as an abbreviation for "protection domain B 310 which implements the name server".

When the server 308 is added to the system, it must register itself so that client applications may invoke the server. The server 308 may register several different services that it can provide to clients. Each service is registered separately and may have a different portal specification and is implemented by a different portal.

Figure 4:
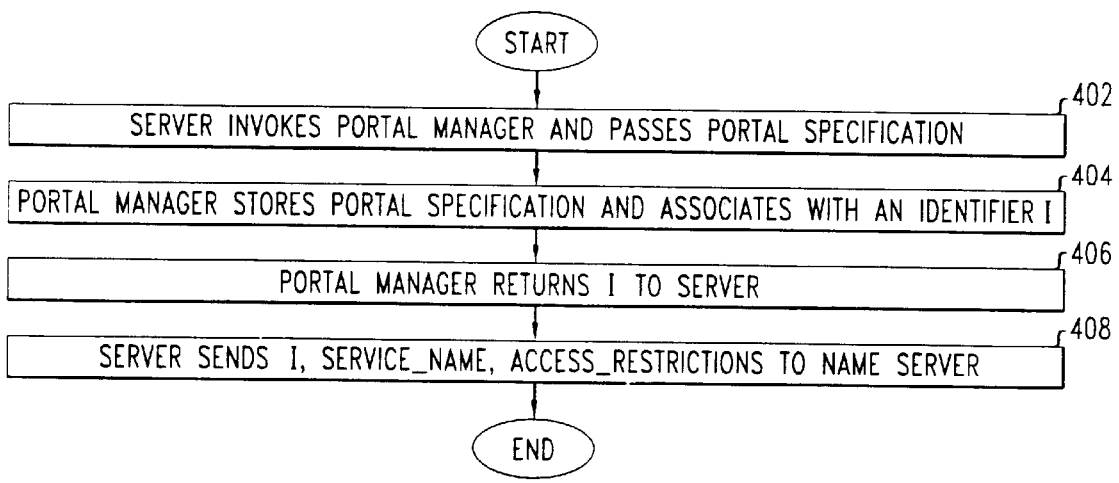
FIG. 4 is a flowchart showing the steps performed during registration of a server.
Figure 5:
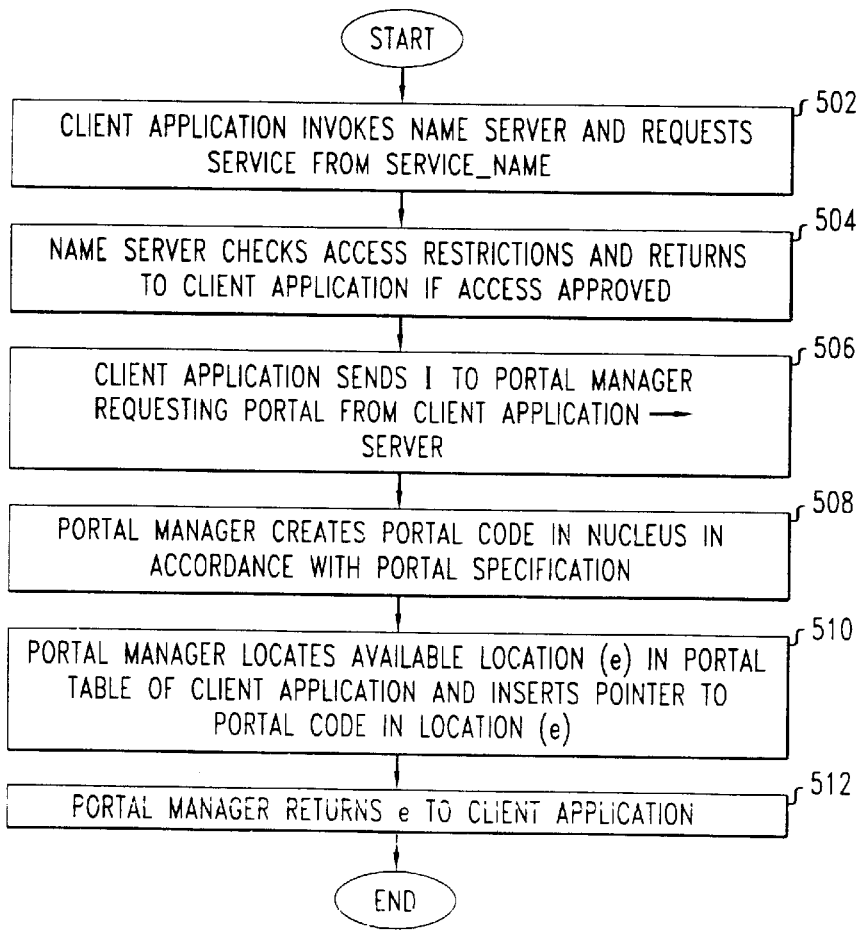
FIG. 5 is a flowchart showing the steps performed during instantiation of a portal.

For clarity, the flowchart of FIG. 4 illustrates the actions associated with the registration of a single service provided by the server 308. In order to register, in step 402 the server 308 invokes the portal manager 314 and passes a portal specification to the portal manager 314. The portal specification defines the behavior of portals which provide access to the server 308. Further details of portal specifications are provided below. The invocation of portal manager 314 by server 308 would be via the portal mechanism in accordance with the invention. However, for clarity, the portal tables and portal code for the server 308, name server 310, and portal manager 314, are not shown. However, it is assumed that, although not shown, the portal tables and portal code for these entities have already been instantiated in the system.

Upon receipt of the portal specification from the server 308, in step 404 the portal manager 314 stores the portal specification and associates an identifier I with the stored portal specification. In step 406, the portal manager 314 returns the identifier I to the server 308. In step 408, the server 408 sends I, service_name, and access_restrictions to the name server 310. Service_name is a name associated with the particular service provided by server 308. Access_restrictions represents a specification of any restrictions as to which clients may access the server. The information sent in step 408 is stored in the name server 310. At this point, the server 308 is registered with the system and may be used by client applications.

In order for a client application to invoke the server, a specific portal must exist which defines the transfer of control from the client application to the server. Such a portal is instantiated in accordance with the steps shown in the flowchart of FIG. 5. In step 502 the client application 312 transmits service_name to name server 310. In step 504 the name server 310 checks the access_restrictions stored in association with the service_name and if access to the server 308 is approved then the name server 310 returns the identification I of the server 308 to the client application 312. In step 506 the client application 312 sends I to the portal manager 314 requesting instantiation of a portal from the client application 312 to the server 308. Thereafter, the portal manager 314 instantiates the portal as follows. In step 508 the portal manager 314 creates portal code 316 in the nucleus in accordance with the portal specification associated with identifier I. In step 510 the portal manager 314 finds an available location (e) in the portal table 318 associated with the client application 312 and inserts a pointer to the portal code 316 in portal table 318 location (e). In step 512 the portal manager 314 returns (e) to the client application 312. At this point, a portal, implemented via portal code 316 and portal table 318, is instantiated in the nucleus 306 which will allow the client application 312 to invoke the server 308. It is noted that the portal manager 314 would also create a symmetric return portal (not shown) for the return path from the server 308 to the client application 312. Thus, in accordance with one aspect of the invention, the portal manager instantiates a portal dynamically. That is, a portal from a first protection domain to a second protection domain is instantiated as needed upon request from the first protection domain.

In an alternate embodiment, steps performed during the registration of a server are modified such that step 406 (FIG. 4) is eliminated. In this embodiment, the portal manager 314 calls the name server 310 in step 408 and passes I, service_name, and access_restrictions to the name server 310. Thus, in this embodiment, the portal manager 314 does not pass identifier I to the server 308. This prevents the server 308 from passing erroneous information to the name server 310. Similarly, in another alternate embodiment, steps 504 and 506 (FIG. 5) which are performed during instantiation of a portal are modified. In this embodiment, after step 502, the name server 310 passes I directly to the portal manager 314 without passing I to the client application 312. This prevents the client application 312 from passing erroneous information to the portal manager 314.

The invocation of the server 308 by the client application 312 via the portal is shown in the flowchart of FIG. 6. In step 602 the client application 312 issues an operating system call with parameter (e). In step 604 the processor switches to privileged mode as a result of the system call instruction. In step 606 the processor performs a lookup to portal table 318 using (e) as an index, and jumps to the memory location indicated by the pointer in the portal table 318. In step 608 the portal code 316 is executed in privileged mode which results in the transfer of control of the executing thread to the server 308.

As described above, the portal specification provided to the portal manager 314 by the server 308 in step 402 defines the operation of the portal which will be dynamically instantiated by the portal manager 314 at the request of a client application. The portal specification is sent to the portal manager 314 by a registering server, thus allowing the registering server to define how portals providing access to that server will behave. The portal specification defines the following functions of the portal:

1) description of what state to save
2) description of parameter manipulation
   a) portal specific constants
   b) functions of nucleus state
   c) functions of nucleus-visible server state
3) description of server invocation
   a) stack manipulation
   b) target protection domain and entry point In accordance with the embodiment described herein, the portal manager receives the portal specification and instantiates a portal by generating portal code based on the portal specification. Thus, there is a close mapping between the portal specification and the portal code. The actual portal code depends on the particular machine on which the invention is being implemented. Thus, the particular portal code generated as a result of the portal specification will not be described in detail herein. One skilled in the art would readily understand how to generate the portal code based on the description of the portal specification.

With respect to the first function, description of what state to save, this is the section which specifies what portion of the processor state of the invoking protection domain to save prior to transferring the execution thread to the invoked protection domain. The state of an invoking protection domain is represented by processor registers and the execution stack of the protection domain. If it is known that the invoked protection domain will only change the state in a limited manner, then only that limited state needs to be saved prior to transferring execution to the invoked protection domain. If the portion of the state which the invoked protection domain will change is unknown, then the entire state must be saved prior to the transfer of control. The saving of state in accordance with the portal specification allows the saving of the minimum amount of state to ensure that the invoking protection domain can be returned to in the same state as when the transfer was invoked. A specification of less than the entire state improves the efficiency of the transfer because processor time is only taken up saving the minimum required state.

The second part of the portal specification defines the parameter manipulation that will take place during portal traversal. Three parameter manipulation techniques which may be specified in the portal specification are described. Technique a) is the insertion of a constant into the parameter list. In accordance with this technique, upon traversal of the portal, a constant, which is private to the invoked protection domain, is embedded in the parameter list which is passed to the invoked protection domain from the invoking protection domain. This constant is permanently associated with the particular portal from the specific invoking protection domain to the specific invoked protection domain and cannot be modified by user level applications. Thus, this constant value is trusted and is immediately available to the invoked protection domain upon portal traversal without any further processing steps.

Parameter manipulation technique b) allows the insertion of a value which is a function of the operating system nucleus state. For example, this value could be an identification of the invoking protection domain. It is noted that this identification is not supplied by the invoking protection domain, but instead is inserted by the operating system itself during traversal of the portal. As such, the identification passed to the invoked protection domain is trusted. Another example of insertion of a value which is a function of the operating system nucleus state is the insertion of the current date/time.

Parameter manipulation technique c) allows for parameter manipulation in accordance with a function of nucleus-visible server state. In accordance with this technique, a first server may register parameter manipulation code which defines the parameter manipulation desired when a client application invokes a second server. Upon instantiation of a particular portal which defines a transfer to the protection domain implementing the second server, the portal manager will insert the parameter manipulation code which has been registered by the first server. The portal manager may have no knowledge of the particular parameter manipulation performed by the parameter manipulation code it is inserting into the portal code. The first and second servers may be the same or different servers.

The third part of the portal specification is the description of server invocation. This portion defines details of the transfer of control from the invoking protection domain to the invoked protection domain. Section a) defines the stack manipulation. For example, to increase efficiency, the portal specification may indicate that the invoked protection domain may share the same execution stack as the invoking protection domain. This requires a mapping of the stack to the invoked protection domain. However, this technique may only be used if the invoked protection domain is trusted such that it will not corrupt the stack. In another technique, which is less efficient but more secure, the portal specification will indicate that a new execution stack is to be set up in memory of the invoked protection domain. Section b) specifies the target protection domain and the entry point within that protection domain.

Thus the portal manager uses the portal specification received by the server in order to instantiate the portal by generating the portal code.

One aspect of the present invention provides a mechanism to open a memory window between two protection domains such that a thread executing in each of the protection domains may access the same physical memory location. This technique is described in conjunction with FIG. 7. FIG. 7 shows protection domain A 702 implementing a client application using virtual memory window 708 which maps to a particular physical memory location, protection domain B 704 implementing a server, and protection domain C 706 implementing a virtual memory manager. When client application 702 requests a service from server 704 it does so by traversing a portal as described above. Thus, the client application 702 issues a system call passing parameter (e). It is assumed that the portal code 712 and appropriate portal entry 714 in the portal table 710 have already been instantiated as described above. As described above in connection with the third parameter manipulation technique, function of nucleus-visible server state, portal code 712 has a code segment 716 which was registered with the portal manager (not shown in FIG. 7) by the operating system virtual memory manager 706. That code segment 716 was inserted into portal code 712 by the portal manager upon creation of the portal code 712. In accordance with the memory window technique, when the client application 702 issues the syscall (e) instruction, the operating system accesses the portal table 710, and jumps to the portal code 712 as indicated by the pointer at portal table entry 714. The code segment 716 will manipulate some data structures belonging to the operating system virtual memory manager 706. As a result, operating system virtual memory manager 706 causes a virtual memory window 708' to be accessible to the server in protection domain B 704. This virtual memory window 708' corresponds to the same physical memory location as virtual memory window 708. This memory mapping allows the server 704 to directly manipulate the memory space utilized by the client application 702. Particularly when large amounts of data need to be shared, this techniques saves a substantial amount of processing time that would otherwise by required to copy memory contents back and forth between the client application 702 and the server 704.

Another aspect of the invention as follows. Consider the act of accessing a file which is managed by a file server. The prior art technique is as follows. A client application requests the opening of a file by sending the command:

OPEN FILE ("F")

to the file server, where "F" is a name for the particular file. The file server returns a file descriptor ("FD"), which is the logical identifier for the file. The file server allocates a file data structure that contains information about the file, allocates an entry in a file table, and places a pointer to the file data structure in the corresponding entry in the file table. The file descriptor FD is typically the index of the corresponding entry in the file table. Thereafter, when the client application wants to perform a read operation, the client application sends the command:

READ FILE (FD)

to the file server. Upon receipt of the READ command, the file server must first verify the correctness of the file descriptor, for example to verify that the parameter FD is within allowable bounds. Upon verifying the correctness, the file server then performs a lookup in the file table using the file descriptor FD and obtains the pointer to the file data structure. Upon obtaining the information from the file data structure, the operating system file server may then perform the read function and return a value to the client application. These verification and lookup steps are performed by the operating system file server each time a client application requests access to a file via a READ, WRITE, SEEK, or CLOSE command.

In accordance with an aspect of the present invention, the performance of file access is substantially improved by instantiating portals for file access commands. This aspect of the invention is described in conjunction with FIG. 8. When a client application executing in protection domain A 802 wishes to access a file, it executes the command

OPEN FILE ("F").

where "F" is a user label for the particular file. A library routine 808 intercepts the OPEN command and translates it to a system call with an index (e) into the portal table 810 of the client application. The index (e) identifies an entry 812 in the portal table 810 which is associated with an OPEN portal implemented by OPEN portal code 814. Portal code 814 implements a transfer of control to the file server executing in protection domain B 804. The file server 804 recognizes the transfer as a request to OPEN the file F because the portal passes parameter F from the client application 802 to the file server 804. At this point, the file server 804 performs parameter checking, to ensure that parameter F is a legal file name, determines whether client application 802 has authority to access the file, and determines the physical location of the file. The file system server 804 allocates a file data structure (FDS) 816, and stores information about the file in the file data structure 816. Such information will allow a future access to the file to be very efficient, and may include information such as the physical location of the file on a disk, the size of the file, and how much of the file has been read. The file server 804 also returns a file descriptor (FD) to the client application 802. As will be described in further detail below, the FD is chosen by the filer server 804 so that the FD may be used as an entry into the portal table 810 of the client application 802 during subsequent file operations.

The file server 804 then calls the portal manager executing in protection domain C 806 and requests that the portal manager 806 create four portals associated with the file F, one each for READ, WRITE, SEEK, and CLOSE. The file server also passes the memory location of the FDS 816 so that the portal manager 806 may embed this information as a constant in the portals. As a result, the portal manager generates READ portal code 818, WRITE portal code 820, SEEK portal code 822, and CLOSE portal code 824. Each portal code 818, 820, 822, 824 contains the FDS location, and the execution of the portal code will result in the addition of the FDS location to the parameter list passed from the client application 802 to the file server 804 during subsequent file accesses. The portal manager 806 also updates the portal table 810 to contain pointers to the newly created portal code. The portal table entries are chosen so that the file descriptor (FD), which was returned to the client application 802 by the file server 804 as a result of the OPEN command, may be used as an index into the portal table. The file server 804 selects a value for the file descriptor FD so that it corresponds to the entries 826, 828, 830, and 832.

For example, entry 826 in the portal table 810 is indexed by FD and is a pointer to the READ portal code 818. Entry 828 in the portal table 810 is indexed by FD+1 and is a pointer to the WRITE portal code 820. Entry 830 in the portal table 810 is indexed by FD+2 and is a pointer to the SEEK portal code 822. Entry 832 in the portal table 810 is indexed by FD+3 and is a pointer to the CLOSE portal code 824. Thus, when the client application issues a subsequent READ (FD) command, the command is intercepted by the library routine 808 and the library routine issues the system call syscall (FD). The system call results in a lookup to the portal table 810 using the index FD and as a result control is transferred to READ portal code 818. The read portal performs parameter manipulation such that it adds the FDS location for the file to the parameter list passed to the file server 804. Thus, when control is passed to the file server 804, the file server immediately has access to the file through the FDS data structure 816. No further parameter checking, authority checking, or table lookups are required because these steps have already been performed when the portals were created by the portal manager 806. Since the portal code is in the operating system nucleus, and cannot be modified by client applications, these portals are trusted and the file server 804 can rely on the FDS location passed to it by the READ portal 818. Thus, as a result, file access time is substantially improved. WRITE, SEEK, and CLOSE commands are handled in a similar manner.

It is noted that the file access techniques described above in connection with FIG. 8 may be combined with the memory window technique described above in conjunction with FIG. 7 to further improve file access in a computer system. For example, in addition to creating specialized portals for file access, a memory window may be created such that a file server may share a physical memory location with a client application requesting access to a file. Thus, when the client application requests to read a block of the file, the file server may read the file directly into the shared memory window, and as a result the file is read directly into the memory of the client application. This saves the time required to copy contents of the file from the memory of the file server to the memory of the client application.

Another aspect of the invention relates to the traversal of a sequence of protection domains as illustrated by FIG. 9. Consider a client application executing in protection domain A 902 which invokes some server executing in protection domain B 904 via portal 908, where portal 908 performs some type of parameter manipulation as described above. Thereafter, prior to returning to the client application 902, the server 904 invokes the server executing in protection domain C 906, via portal 910, where portal 910 also performs some type of parameter manipulation on the same parameters which were manipulated by portal 908. In such a configuration, portal 910 must manipulate the common parameters in a manner which is compatible with the manipulation by portal 908. For example, if a constant is inserted in to the parameter list by portal 908, that same parameter is passed by portal 910 without change.

The table below indicates rules for compatible parameter manipulation in a configuration as shown in FIG. 9.

| Parameter manipulation from protection domain A → protection domain B | Parameter manipulation from protection domain B → protection domain C |
|---|---|
| Constant Identity of calling thread Identity of calling domain (A) Open memory window | pass with no change identity of calling thread identity of calling domain (B) Open memory window |

Thus, constants are passed with no change. If the identity of the calling thread is inserted as a function of nucleus state in portal 908, then the identity of the calling thread will be the same during traversal of portal 910 because it is the same thread executing in different protection domains. If portal 908 inserts the identity of the calling domain, then the value inserted would be the identification of protection domain A. However, when portal 910 inserts the identity of the calling domain, then the value inserted would be the identification of protection domain B. Finally, if the portal 908 opens a memory window in protection domain B as described above in connection with FIG. 7, then portal 910 may open the same memory window in protection domain C. It is noted that this last example of opening a memory window is implemented as described above by inserting a registered code segment in the portal code. The virtual memory server which registers that code with the portal manager indicates the compatible parameter manipulation for the registered code. For example, it may indicate that the code may be executed again by the invoked protection domain. There may be additional types of parameter manipulations that are a function of nucleus-visible state. For each parameter manipulation type, the server which registered the corresponding portal code must specify how to perform compatible parameter manipulation.

The above sequence of portal traversals may be used for interposition of a controlling server C between any pair of client application A and server B. In such a case, the portal table of client application A is modified so that all of the portals that client application A may invoke transfer control to the controlling server C. The controlling server C may check, modify or process the parameters of the portal, and then call the server B using compatible parameter manipulation. This technique may be used to monitor un-trusted client applications and enforce correct behavior.

As would be recognized by one skilled in the art, there are various opportunities to implement optimization techniques in accordance with the techniques described herein. For example, if the same portal code is duplicated among different portal instantiations, the portal code could be shared, with multiple portal table pointers pointing to the same portal code stored in memory. In accordance with this technique, each portal is logically independent and specific for the traversal from one protection domain to another, but the code could be shared rather than duplicating the same code in memory. The portal code for forward and return portals could be shared in this manner.

Further, a thread executing in a first protection domain may request the instantiation of a portal between a second protection domain and a third protection domain. The portal manager will verify that the thread executing in the first protection domain has the authority to request the instantiation of the portal between the second protection domain and the third protection domain. If the first protection domain has the authority, then the portal will be instantiated.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the embodiment described shows the portal manager generating portal code from the portal specification and storing the portal code in memory for use during a portal traversal. Alternatively, instead of executing previously generated portal code, portals could be implemented by interpreting the portal specification each time a traversal is made between two protection domains.

We claim:

1. A method for operation of a computer system for transferring control of an executing thread between a first protection domain and a second protection domain wherein a first parameter list is passed between said first and second protection domains, said method comprising the step of:
    invoking a first portal which defines a transfer of control between said first and second protection domains and defines whether an execution stack is to be directly shared between said first and second protection domains;
    said first portal invocation resulting in the insertion of a value which is a function of the state of the computer system in said parameter list.

2. The method of claim 1 further comprising the step of:
    invoking a second portal which defines a transfer of control between said second protection domain and a third protection domain, wherein a second parameter list is passed between said second and third protection domains;
    said second portal invocation resulting in parameter manipulation compatible with said first portal.

3. The method of claim 1 wherein said function of the state of the computer system is an identification of an invoking protection domain.

4. The method of claim 1 wherein said function of the state of the computer system is a current date/time.

5. A method for operation of a computer system for transferring control of an executing thread between a first protection domain and a second protection domain wherein parameters are passed between said first and second protection domains, said method comprising the step of:
    invoking a first portal which defines a transfer of control between said first and second protection domains;
    said first portal invocation resulting in the execution of portal code comprising a segment which is supplied by a server.

6. The method of claim 5 wherein said segment of portal code defines parameter manipulation.

7. The method of claim 5 wherein the execution of said segment of portal code results in the sharing of a memory window between said first and second protection domains.

8. The method of claim 5 further comprising the step of:
    invoking a second portal which defines a transfer of control between said second protection domain and a third protection domain, wherein parameters are passed between said second and third protection domains;
    said second portal invocation resulting in parameter manipulation compatible with said first portal.

9. The method of claim 5 wherein said first portal further defines whether an execution stack is to be directly shared between said first and second protection domains.

10. A computer system comprising:
    a plurality of user level protection domains;
    a plurality of portals each defining a transfer of control of an executing thread between a first protection domain and a second protection domain; and
    a portal manager resident in one of said user level protection domains for dynamically generating portal code for instantiating said portals.

11. The computer system of claim 10 wherein said portal code comprises computer program instructions defining:
    the insertion of a value which is a function of the state of the computer system in a parameter list which is passed between said first and second protection domains.

12. The computer system of claim 11 wherein said function of the state of the computer system is an identification of an invoking protection domain.

13. The computer system of claim 11 wherein said function of the state of the computer system is a current date/time.

14. The computer system of claim 10 wherein said portal code comprises a code segment which is supplied by a server.

15. The computer system of claim 14 wherein said code segment defines parameter manipulation.

16. The computer system of claim 10 wherein said portal code comprises computer program instructions defining whether an execution stack is to be directly shared between said first and second protection domains.

17. A method for registering a first server for use by client applications comprising the steps of:

said first server providing a portal specification to a portal manager resident in a user level protection domain, said portal specification defining a transfer of control to said first server;

said portal manager associating an identifier with said portal specification; and said portal manager instantiating said portal in response to receipt of said identifier.

18. The method of claim 17 wherein said step of instantiating comprises the step of:

generating portal code in accordance with said portal specification.

19. The method of claim 18 further comprising the step of:

said portal manager updating a portal table associated with a client application.

20. The method of claim 19 wherein said step of updating comprises:

inserting a pointer to said portal code in said portal table.

21. The method of claim 17 further comprising the step of:

said portal manager transmitting said identifier to said first server.

22. The method of claim 21 further comprising the step of:

said server transmitting said identifier, a service name, and access restrictions to a name server.

23. The method of claim 22 further comprising the steps of:

said client application transmitting said service name to said name server;

said name server determining whether said client application is authorized to access said first server based on said access restrictions;

said name server transmitting said identifier to said client application if said client application is authorized to access said first server; and said client application transmitting said identifier to said portal manager.

24. The method of claim 22 further comprising the steps of:

said client application transmitting said service name to said name server;

said name server determining whether said client application is authorized to access said first server based on said access restrictions; and said name server transmitting said identifier to said portal manager if said client application is authorized to access said first server.

25. The method of claim 17 further comprising the step of:

said portal manager transmitting said identifier to a name server.

26. A method for operation of a computer system comprising the steps of:

in response to receipt of a request to open a file from a client application, generating a file data structure and storing said file data structure in memory;

instantiating at least one file access portal, each of said at least one file access portals being associated with a file access command and including an embedded pointer to said file data structure.

27. The method of claim 26 further comprising the step of:

in response to receipt of a file access command from a client application, invoking the portal associated with said file access command.

28. The method of claim 27 wherein said file access command includes a parameter list, wherein said step of invoking comprises the step of:

inserting said embedded pointer in said parameter list.

29. The method of claim 26 further comprising the steps of:

intercepting file access commands at said client application; and translating said file access commands into portal invocation requests.

* * * * *